United States Patent
Ahmed

(10) Patent No.: US 9,729,378 B1
(45) Date of Patent: Aug. 8, 2017

(54) RECEIVER ARCHITECTURE FOR CONSTANT ENVELOPE OFDM

(71) Applicant: The United States of America as represented by the Secretary of the Navy, Washington, DC (US)

(72) Inventor: Ahsen Ahmed, San Diego, CA (US)

(73) Assignee: THE UNITED STATES OF AMERICA AS REPRESENTED BY THE SECRETARY OF THE NAVY, Washington, DC (US)

( * ) Notice: Subject to any disclaimer, the term of this patent is extended or adjusted under 35 U.S.C. 154(b) by 200 days.

(21) Appl. No.: 14/754,410

(22) Filed: Jun. 29, 2015

Related U.S. Application Data

(60) Provisional application No. 62/146,720, filed on Apr. 13, 2015.

(51) Int. Cl.
| | | |
|---|---|---|
| H04L 27/26 | (2006.01) | |
| H04B 10/61 | (2013.01) | |
| H04J 11/00 | (2006.01) | |
| H04L 27/227 | (2006.01) | |

(52) U.S. Cl.
CPC ....... *H04L 27/2697* (2013.01); *H04B 10/612* (2013.01); *H04J 11/0023* (2013.01); *H04L 27/2273* (2013.01); *H04L 27/2691* (2013.01); *H04J 2011/0016* (2013.01)

(58) Field of Classification Search
CPC ............. H04L 27/2697; H04L 27/2273; H04L 27/2691; H04J 11/0023; H04J 2011/0016; H04B 10/612
See application file for complete search history.

(56) References Cited

U.S. PATENT DOCUMENTS

| | | | | |
|---|---|---|---|---|
| 8,073,079 | B1* | 12/2011 | Ahmed | H04L 27/2275 329/318 |
| 2012/0256673 | A1* | 10/2012 | Fujibayashi | H04L 27/366 327/238 |
| 2015/0080063 | A1* | 3/2015 | Sorrells | H04W 52/0209 455/574 |

(Continued)

OTHER PUBLICATIONS

H. Ochiai and H. Imai, "On the distribution of the peak-to-average power ratio in OFDM signals," IEEE Trans. Commun., vol. 49, No. 2, pp. 282-289, Feb. 2001.

(Continued)

*Primary Examiner* — Ayaz Sheikh
*Assistant Examiner* — Hai-Chang Hsiung
(74) *Attorney, Agent, or Firm* — SPAWAR Systems Center Pacific; Kyle Eppele; Ryan J. Friedl

(57) ABSTRACT

A system and method involve receiving, at a processor, a phase modulated signal such as an optical or electromagnetic signal, using one or more samples of an in-phase component I(t) and a quadrature component Q(t) of the received phase modulated signal to generate, at the processor, a processed signal using the equation [A−B×I(t)]×Q(t), where A and B are numerical parameters, and inputting the processed signal into a receiver operatively connected to the processor. The processed signal may be filtered prior to being input into the receiver. Parameters A and B may be selected to vary complexity and performance of the receiver while controlling distortion for different modulation indices.

8 Claims, 13 Drawing Sheets

(56) References Cited

U.S. PATENT DOCUMENTS

2016/0285481 A1* 9/2016 Cohen ..................... H01Q 3/34

OTHER PUBLICATIONS

S. H. Hang and J. H. Lee, "An overview of peak-to-average power ratio reduction techniques for multicarrier transmission," IEEE Wireless Commun., vol. 12, issue 2, pp. 56-65, Apr. 2005.

F. H. Raab, P. Asbeck, S. Cripps, P. B. Kenington, Z. B. Popovic, N. Pothecary, J. F. Sevic, and N. O. Sokal, "Power amplifiers and transmitters for RF and microwave," IEEE Trans. Microwave Theory Tech., vol. 50, No. 3, pp. 814-826, Mar. 2002.

T. Svensson and T. Eriksson, "On Power Amplifier Efficiency with Modulated Signals," in Proc. of IEEE Veh. Tech. Conf., Taipei, 2010.

A. L. Swindlehurst, E. Ayanoglu, P. Heydari, and F. Capolino, "Millimeter-wave massive MIMO: the next wireless revolution?;" in IEEE Commun. Mag., vol. 52, No. 9, pp. 56-62, Sep. 2014.

S. C. Thompson, A. U. Ahmed, J. G. Proakis; J. R. Zeidler and M. J. Geile, "Constant Envelope OFDM," IEEE Trans. Commun., vol. 56, No. 8, pp. 1300-1312, Aug. 2008.

S.C. Thompson, "Constant Envelope OFDM Phase Modulation," Ph.D. dissertation, University of California, San Diego, 2005. [Online]. Available: http://zeidler.ucsd.edu/students/thesis_sthompson.pdf.

S.C. Thompson, J.G. Proakis, and J.R. Zeidler, "Constant Envelope Binary OFDM Phase Modulation," in Proc. of IEEE Milcom, Boston, MA, 2003.

S.C. Thompson, A.U. Ahmed, J.G. Proakis, and J.R. Zeidler, "Constant Envelope OFDM Phase Modulation: Spectral Containment, Signal Space Properties and Performance," in Proc. of IEEE Milcom, Monterey, CA, 2004.

Y. Tsai and G. Zhang, "Orthogonal Frequency Division Multiplexing with Phase Modulation and Constant Envelope Design," in Proc. of IEEE Milcom, Atlantic City, NJ, 2005.

M. Kiviranta, A. Mammela, D. Cabric, D. A. Sobel, and R. W. Brodersen, "Constant Envelope Multicarrier Modulation: Performance" Evaluation in AWGN and Fading Channels, in Proc. of IEEE Milcom, Atlantic City, NJ, 2005.

A. U. Ahmed, S. C. Thompson, and J. R. Zeidler, "Constant Envelope OFDM with Channel Coding," in Proc. of IEEE Milcom, Washington, DC, 2006.

A. U. Ahmed, S. C. Thompson, and J. R. Zeidler, "Threshold extending receiver structures for CE-OFDM," in Proc. of IEEE Milcom, Orlando, FL, 2007.

A. U. Ahmed, S. C. Thompson, and J. R, Zeidler, "Channel estimation and equalization for CE-OFDM in multipath fading channels," in Proc. of IEEE Milcom, San Diego, CA, 2008.

R. Daniels and R. Heath, "60 GHz wireless communications: emerging requirements and design recommendations," in IEEE Veh. Tech. Mag., vol. 2, No. 3, Sep. 2007.

Char-Dir Chung, "Spectral precoding for constant-envelope OFDM," IEEE Trans. Commun., vol. 58, No. 2, Feb. 2010, pp. 555-567.

Zujun Liu, "Reducing specific inter-symbol interference of constant envelope OFDM system through optimizing zero-padding pattern" in Proc. of ICSPCC, Xi'an, 2011.

A. U. Ahmed, S. C. Thompson, D. W. Chi, and J. R. Zeidler, "Subcarrier based threshold performance enhancement in Constant Envelope OFDM," in Proc. of IEEE Milcom, Orlando, FL, 2012.

JAL Silva et al., "A PAPR Reduction Technique Based on a Constant Envelope OFDM Approach for Fiber Nonlinearity Mitigation in Optical Direct-Detection Systems," in J. of Optical Commun. and Netw., vol. 4, No. 4, pp, 296-303; Apr. 2012.

J. Silva et al., "Experimental Demonstration of a Direct-Detection Constant Envelope OFDM System," in Proc. of Signal Process. in Photonic Commun., Karlsruhe, Germany, 2010.

J . von Hoyningen-Huene, J. Leibrich, A. Ali, W. Rosenkranz, "Constant envelope optical OFDM for improved nonlinear and phase noise tolerance", in Proc. of Optical Fiber Commun. Conf., Los Angeles, CA, 2011.

J.M. Fabrega et al., "Constant envelope coherent optical OFDM based on fast Hartley transform," in Proc. of Conf. on Transparent Optical Networks, Stockholm, 2011.

El Ghzaoui Mohammed, B. Jamal, and B. Ali, "Performance Evaluation of CE-OFDM in PLC Channel," in Signal Processing: An international journal (SPIJ), vol. 4, No. 6, pp. 318-328, 2011.

E. Cianca, et al., "EHF for Satellite Communications: The New Broadband Frontier," in Proc. of the IEEE, vol. 99, No. 11, pp. 1858-1881, Jul. 2011.

S.C. Thompson, J.P. Stralka, "Constant envelope OFDM for power-efficient radar and data communications," in Proc. of Int. Waveform Diversity and Design Conf., Kissimmee, FL, 2009, pp. 291-295.

S. Sen and A. Nehorai, "Adaptive OFDM Radar for Target Detection in Multipath Scenarios," in IEEE Trans. Signal Process., vol. 59, No. 1, pp. 78-90, Jan. 2011.

van Genderen, P., "Recent advances in waveforms for radar, including those with communication capability," in Proc. of European Radar Conference (EuRAD), pp. 318-325, Sep. 2009.

K. Davaslioglu and E. Ayanogiu, "Quantifying Potential Energy Efficiency Gain in Green Cellular Wireless Networks," in IEEE Commun. Surveys and Tutorials; vol. 16, No. 4, pp. 2065-2091, May 2014.

T. Rappaport, J. Murdock, and F. Gutierrez, "State of the Art in 60-GHz Integrated Circuits and Systems for Wireless Communications," in Proc. of the IEEE, vol. 99, No. 88, pp. 1390-1436, Aug. 2011.

C. Doan, S. Emami, D. Sobel, A. Niknejad, and R. Brodersen, "Design Considerations for 60 GHz CMOS Radios," in IEEE Commun. Mag., vol. 42, No. 12, pp. 132-140, Dec. 2004.

T. Cui and C. Tellambura, "Semiblind channel estimation and data detection for OFDM systems with optimal pilot design," in IEEE Trans. Commun., vol. 55, No. 5, pp. 1053-1062, 2007.

* cited by examiner

US 9,729,378 B1

RECEIVER ARCHITECTURE FOR CONSTANT ENVELOPE OFDM

CROSS-REFERENCE TO RELATED APPLICATIONS

This application claims the benefit of U.S. Provisional Patent Application Ser. No. 62/146,720 filed Apr. 13, 2015, entitled "Receiver Architecture for Constant Envelope OFDM", the content of which is fully incorporated by reference herein.

FEDERALLY-SPONSORED RESEARCH AND DEVELOPMENT

The Receiver Architecture for Constant Envelope OFDM is assigned to the United States Government and is available for licensing for commercial purposes. Licensing and technical inquiries may be directed to the Office of Research and Technical Applications, Space and Naval Warfare Systems Center, Pacific, Code 72120, San Diego, Calif., 92152; voice (619) 553-5118; email ssc_pac_T2@navy.mil; reference Navy Case Number 102354.

BACKGROUND

There exists a need for a Constant Envelope (CE) Orthogonal Frequency Division Multiplexing (OFDM) receiver architecture for low to moderate modulation indices that does not require a phase demodulator and, hence, is immune to cycle slip noise due to phase wrapping issues and the threshold effect.

DETAILED DESCRIPTION OF SOME EMBODIMENTS

Figure 1:
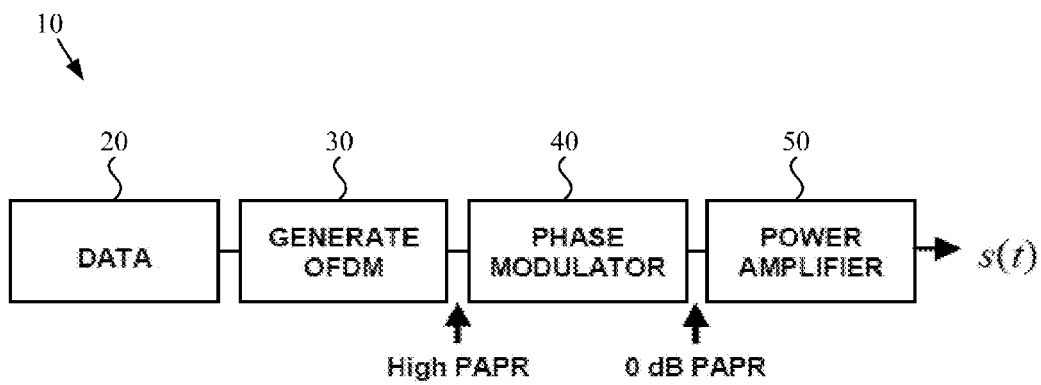
FIG. 1 shows a block diagram of an embodiment of a CE OFDM transmitter.

OFDM is widely used for wireless communication for both commercial and military applications. Despite its many advantages, OFDM also suffers from major limitations including a high peak-to-average power ratio (PAPR), which results in intermodulation distortion among subcarriers and out-of-band spectral radiation at the non-linear power amplifier. It is customary to use a significant back off and operate in the linear region of the amplifier to reduce, but not completely eliminate, the unwanted distortion and the accompanying spectral broadening. Such a back off not only reduces the transmit power but also results in low power amplifier efficiency. This is especially detrimental for mobile devices operating on battery power. For example, a class A amplifier operating with a 6 dB back off has a maximum efficiency of only 12.5%. In fact, being limited to a more linear amplifier such as a class A amplifier due to design constraints and operating with a back off can consume five times or more power than an alternate amplifier feasible for a constant envelope signal.

CE-OFDM provides one solution to the high PAPR issue in OFDM. Various PAPR reduction techniques have been previously developed for OFDM but these do not completely eliminate the OFDM PAPR issue. In comparison, CE-OFDM transforms the high PAPR OFDM signal to a constant envelope signal using phase modulation. This not only eliminates the need for a back off at the power amplifier, maximizing both transmit power and efficiency, but it also enables the use of even more non-linear, power efficient and cost effective amplifiers that are not feasible for OFDM.

The various aspects of the performance and applications of CE-OFDM have been studied previously. Due to the major advantage of a constant envelope, CE-OFDM is being researched for applications as varied as wireless, optical, power line and satellite communications, as well as radar. CE-OFDM also offers many advantages for energy efficiency in cellular wireless networks.

With the continuing rapid growth of wireless communication based applications and the expected increase in future demand, the need for further spectrum will remain high. The availability of 7 GHz of unlicensed spectrum around 60 GHz, which is much greater than the current combined allocation for radio, TV, cellular, satellite and WiMAX bands, makes it an ideal candidate for future high rate communication. A further benefit of operating at such high frequencies is that the size of components including the antenna is very small enabling the transceiver implementation on a chip.

Advances in CMOS technology have made CMOS an attractive choice for low cost, highly integrated transceiver implementation at high frequencies. However, component design, including the power amplifier, remains challenging at high frequencies with added requirements for linearity coming at the expense of performance and a further increase in complexity and cost. CE-OFDM, with its constant envelope, reduces design complexity and cost while enabling maximum performance and power efficiency, thereby providing a very attractive choice for communication at high frequencies including the 60 GHz band. These advantages more than compensate for the reduction in bandwidth efficiency for CE-OFDM compared to OFDM, especially with the vast amount of bandwidth available at high frequencies.

Further, spectral precoding techniques may be employed to improve CE-OFDM spectral efficiency. Due to these advantages, CE-OFDM has been proposed as an attractive option for millimeter band communications in support of 5G, the next generation wireless communication standard.

CE-OFDM is based on angle modulation and therefore, under certain conditions during phase demodulation, it is susceptible to the well-known threshold effect whereby the demodulated signal to noise ratio (SNR) falls off much more rapidly than the input carrier to noise ratio (CNR). The threshold effect is encountered at low CNR due to the appearance of phase cycle slips at the output of the phase demodulator and results in a degradation of the demodulated SNR and, consequently, the performance.

The subject matter disclosed herein provides a solution to the issue of high peak-to-average power ratio in OFDM by using angle modulation to transform the OFDM signal to a constant envelope signal. The modulation index of CE-OFDM controls this transformation. The embodiments involve a receiver architecture for CE-OFDM based on the Taylor series expansion, alleviating the need for angle demodulation at the receiver. This results in immunity from phase cycle slips due to phase wrapping and the threshold effect which would otherwise cause performance degradation. These receivers allow for a simpler implementation without the need to compute the arctangent at the receiver.

As discussed herein, this receiver architecture performs well when compared to the conventional arctangent based receiver for small and moderate modulation indices ($2\pi h \leq 0.7$) for the cases of additive white Gaussian noise and multipath fading. For frequency selective fading, it is shown that the application of a frequency domain equalizer results in good performance when the receiver architecture is employed. Also disclosed herein is the performance of embodiments of the receiver architecture when error correction coding is employed, showing that they not only provide excellent performance, but also significantly outperform the conventional arctangent based receiver for coded CE-OFDM performance.

For example, for the case of a frequency selective fading channel with an exponential power delay profile as considered in this paper, the enhanced receiver provided a gain of over 1.6 dB compared to the arctangent receiver at a BER of 10-3. The results for both AWGN and multipath fading channels with error correction coding show that these new receiver structures provide an attractive choice for any practical implementation of CE-OFDM.

CE-OFDM is based on a simple transformation of the OFDM signal as shown in transmitter diagram 10 of FIG. 1. Data 20 is used to generate an OFDM signal at box 30, which has a high PAPR. A phase modulator 40 embeds the OFDM signal within the phase of a constant envelope signal using phase modulation. This results in a constant envelope signal with a 0 dB PAPR. A power amplifier 50 may be used prior to signal transmission. The output baseband CE-OFDM signal s (t) is given as $$s(t) = A e^{j\phi(t)} \quad \text{(Eq. 1)}$$

where A is the signal amplitude. The phase signal, $\phi(t)$, with the embedded OFDM signal is given as $$\phi(t) = 2\pi h C_N \sum_{k=1}^{N} d_{ik} q_k(t - iT_s), \ iT_s \leq t \leq (i+1)T_s. \quad \text{(Eq. 2)}$$

The data symbols, $d_{ik}\{\pm 1\}$, modulate the N orthogonal OFDM subcarriers $q_k(t)\{\cos(2\pi kt/T_s), \sin(2\pi kt/T_s)\}$ for k=1 to N/2. Ts is the CE-OFDM block period. The normalizing constant, $$C_N = \sqrt{2/\sigma_I^2 N},$$

ensures that the phase variance is independent of the number of OFDM subcarriers N. $\sigma_I^2$ is the data variance with $\sigma_I^2=1$ for binary data. The modulation index h is the key parameter that controls the tradeoff between performance and bandwidth for CE-OFDM. The scaled modulation index ($2\pi h$) is also simply referred to as the modulation index. CE-OFDM works well for a 2× or higher sampling rate at the receiver. An oversampling factor of Ros=2 is used, i.e. Ns=2N samples per CE-OFDM symbol are used for all simulation cases.

Figure 2:
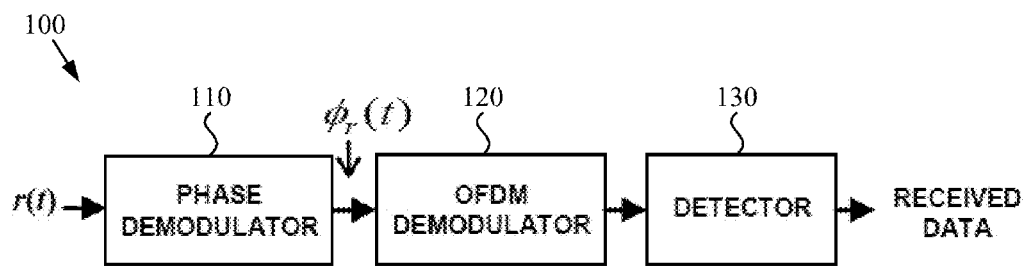
FIG. 2 shows a block diagram of an embodiment of a conventional CE OFDM receiver.

The conventional receiver structure for CE-OFDM is shown in diagram 100 in FIG. 2. A received signal r(t) is input into a phase demodulator 110 to undo the phase modulation transformation. Phase demodulator 110 is followed by a standard OFDM demodulator 120, which outputs a demodulated signal to detector 130, which outputs the received data. This provides for a practical receiver implementation for CE-OFDM.

The baseband received CE-OFDM signal r(t) is given as $$r(t) = A e^{j\phi(t)} + n(t) = I_r(t) + jQ_r(t) \quad \text{(Eq. 3)}$$

Where $n(t) = n_c(t) + jn_s(t)$ is the baseband Gaussian distributed noise with power spectral density $$\phi_n(f) = \begin{cases} N_0, & |f| \leq B/2 \\ 0, & |f| > B/2 \end{cases} \quad \text{(Eq. 4)}$$

where B is the system front-end bandwidth. The in phase and quadrature noise components are independent with autocorrelation $$R_{n_c n_c}(\tau) = R_{n_s n_s}(\tau) = N_0 \frac{\sin(\pi B \tau)}{\pi \tau}.$$

The sampling rate (Fs=1/T0) is taken to equal the bandwidth B resulting in independent Gaussian noise samples at the receiver.

Figure 3:
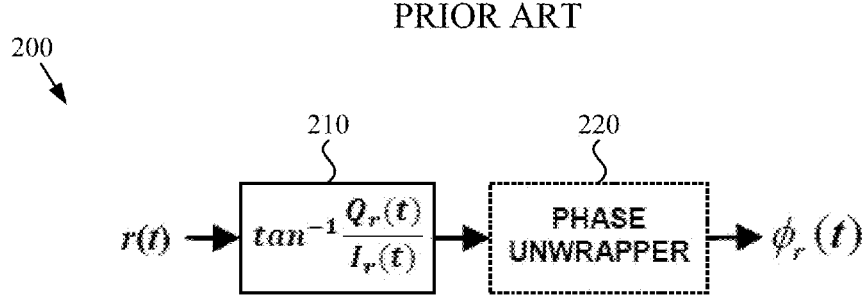
FIG. 3 shows a block diagram of an embodiment of an arctangent-based phase demodulator used in a CE OFDM receiver.

An arctangent based phase demodulator as shown in diagram 200 in FIG. 3 has been used for phase demodulation in CE-OFDM. The phase of the baseband received signal r(t) is extracted in the step in box 210 by taking the inverse tangent of the quadrature baseband components. The arctangent provides the instantaneous phase which is restricted to the (−π, +π] range. Phase excursions outside this range, such as for large OFDM signal peaks, result in phase wrapping. Therefore, it is necessary to use a phase unwrapper 220 for larger modulation indices to reconstruct the original unrestricted phase. The phase unwrapper is prone to making errors resulting in phase cycle slips due to the presence of noise, especially at low SNR when significant noise is present. For low and moderate modulation indices (2πh≤0.7), phase wrapping is less frequent and the arctangent based receiver can be employed without a phase unwrapper. In such cases, phase wrapping occurs less frequently and results in burst errors.

The need to implement a phase demodulator in the conventional CE-OFDM receiver results in increased receiver implementation complexity. The arctangent based receiver requires the computation of the arctangent at the receiver. This can be accomplished by using a lookup table at the receiver. However, this lookup table needs to be quite large for high accuracy. Additionally, the table address values still need to be computed at the receiver. Alternately, several algorithms are available for computing the arctangent but due to the fact that the arctangent is a highly nonlinear function, these algorithms require a high computational complexity. For example, the popular CORDIC algorithm requires 10-12 iterations to attain a 0.1 degree accuracy. Other lower complexity algorithms still require several multiplications and divisions.

The receiver embodiments disclosed herein eliminate the phase demodulator 110 in the conventional CE-OFDM receiver as shown in FIG. 2. As discussed herein, this receiver architecture provides excellent performance and is based on the Taylor series expansion of the CE-OFDM signal. With m(t) representing the normalized OFDM signal, the CE-OFDM signal can be given as $s(t)=Ae^{j2\pi hm(t)}$. Without loss of generality, the amplitude (A) is set to 1. The CE-OFDM signal can then be expressed as $$s(t)=e^{j2\pi hm(t)}=\cos(2\pi hm(t))+j\sin(2\pi hm(t))=I(t)+jQ(t). \quad \text{(Eq. 5)}$$

By employing the Taylor series expansion, the in phase and quadrature components of CE-OFDM are given as $$\cos(2\pi hm(t)) = \sum_{n=0}^{\infty} \frac{(-1)^n}{(2n)!}(2\pi hm(t))^{2n} = \quad \text{(Eq. 6)}$$

$$1 - \frac{(2\pi hm(t))^2}{2!} + \frac{(2\pi hm(t))^4}{4!} - \frac{(2\pi hm(t))^6}{6!} + \ldots$$

$$\sin(2\pi hm(t)) = \sum_{n=0}^{\infty} \frac{(-1)^n}{(2n+1)!}(2\pi hm(t))^{2n+1} = \quad \text{(Eq. 7)}$$

$$2\pi hm(t) - \frac{(2\pi hm(t))^3}{3!} + \frac{(2\pi hm(t))^5}{5!} - \frac{(2\pi hm(t))^7}{7!} + \ldots$$

Note that the first term of the Taylor series expansion of the quadrature component is the normalized OFDM signal. The contribution from the remaining higher order terms decreases with a decrease in the modulation index (2πh). Therefore, for small modulation indices when the higher order terms in the Taylor expansion are relatively negligible compared to the first term, a simple linear receiver can be devised by only employing the quadrature component of the received CE-OFDM signal. This basic linear receiver is essentially a direct OFDM receiver applied to the quadrature component of the received CE-OFDM signal, thereby reducing the overall CE-OFDM receiver complexity.

The basic linear receiver works well for small modulation indices (2πh≤0.5), as the higher order terms are negligible. However the higher order terms become more significant for higher modulation indices. The first term of (Eq. 7) is the desirable OFDM signal while the other higher order terms contribute to distortion with their contributions decreasing as their order increases for the case of modulation indices below 1 (2πh<1). It is clear that the second term, (2πhm(t))3/3!, contributes the largest amount of distortion.

Figure 4:
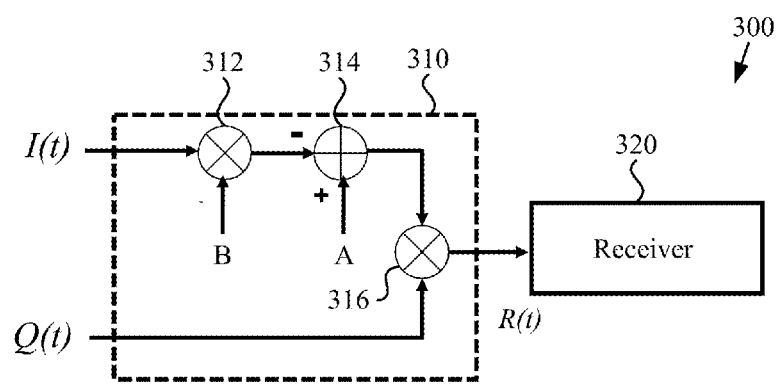
FIG. 4 shows a block diagram of an embodiment of a receiver in accordance with the Receiver Architecture for Constant Envelope OFDM.

An improved receiver can be developed by using both the in phase and quadrature components of the CE-OFDM signal to cancel out the most significant cubic distortion term. FIG. 4 shows a block diagram of this enhanced receiver system 300. As shown in FIG. 4, the in-phase component I(t) and quadrature component Q(t) of a received phase modulated signal are input into a processor 310. In some embodiments, the received phase modulated signal is an optical signal. In some embodiments, the received phase modulated signal is an electromagnetic signal. In some embodiments, the electromagnetic signal is a CE-OFDM signal. As an example, the electromagnetic signal may be a CE single-carrier frequency division multiple access (SC-FDMA) signal.

Within processor 310, a mixer 312 combines I(t) with B, a numerical parameter. The output of mixer 312 is then summed with A, another numerical parameter, at summer 314. In some embodiments, A and B are selected to vary complexity and performance of the receiver while controlling distortion for different modulation indices. As an example, in some embodiments A=1 and B=0, in some embodiments A=2 and B=1, and in some embodiments A=4 and B=1.

Figure 5:
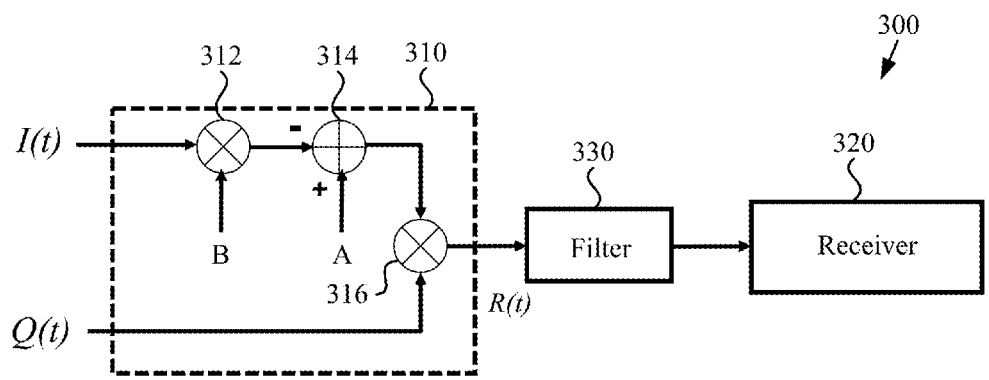
FIG. 5 shows a block diagram of an embodiment of a receiver in accordance with the Receiver Architecture for Constant Envelope OFDM.

The output of summer 314 is then combined with Q(t) at mixer 316, the output of which, R(t), is input to receiver 320 for processing to retrieve the sent data. In some embodiments, receiver 320 is an OFDM receiver. FIG. 5 shows another embodiment of system 300 including a filter 330 between processor 310 and receiver 440. While optional in some embodiments, such as those used for CE-OFDM, filter 330 helps remove out of band distortion that may impact receiver 320.

Figure 6:
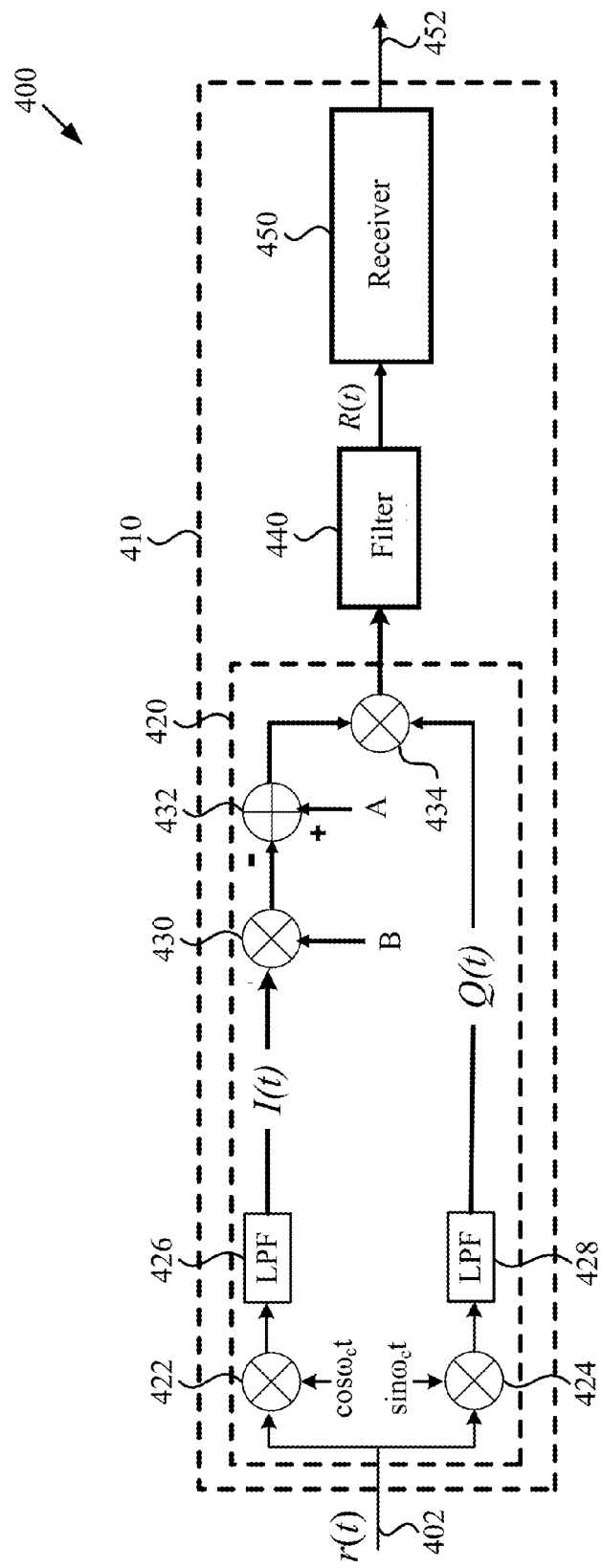
FIG. 6 shows a block diagram of an embodiment of a receiver in accordance with the Receiver Architecture for Constant Envelope OFDM.

FIG. 6 shows a diagram of an embodiment of a receiver system 400 in accordance with the Receiver Architecture for Constant Envelope OFDM. A phase modulated signal r(t) 402 is received by system 410 and input into processor 420. The received signal is mixed with the in-phase carrier signal, cos $\omega_c t$, at mixer 422 and mixed with the quadrature carrier signal, sin $\omega_c t$, at mixer 424. The output of mixer 422 is passed through low-pass filter 426 to produce in-phase component I(t), while the output of mixer 424 is passed through low-pass filter 428 to produce quadrature component Q(t).

Similarly to as shown in FIGS. 4 and 5, a mixer 430 combines I(t) with B, a numerical parameter. The output of mixer 430 is then summed with A, another numerical parameter, at summer 432. The output of summer 432 is then combined with Q(t) at mixer 434, the output of which, R(t), may in some embodiments be filtered by filter 440 and input into receiver 450. In some embodiments, such as those used for CE-OFDM, a separate filter 440 is not necessary, as R(t)

may be input directly into receiver 450. Receiver 450 may contain filtering means therein. Receiver 450 processes the signal and outputs signal 452, which represents the sent data.

Figure 7:
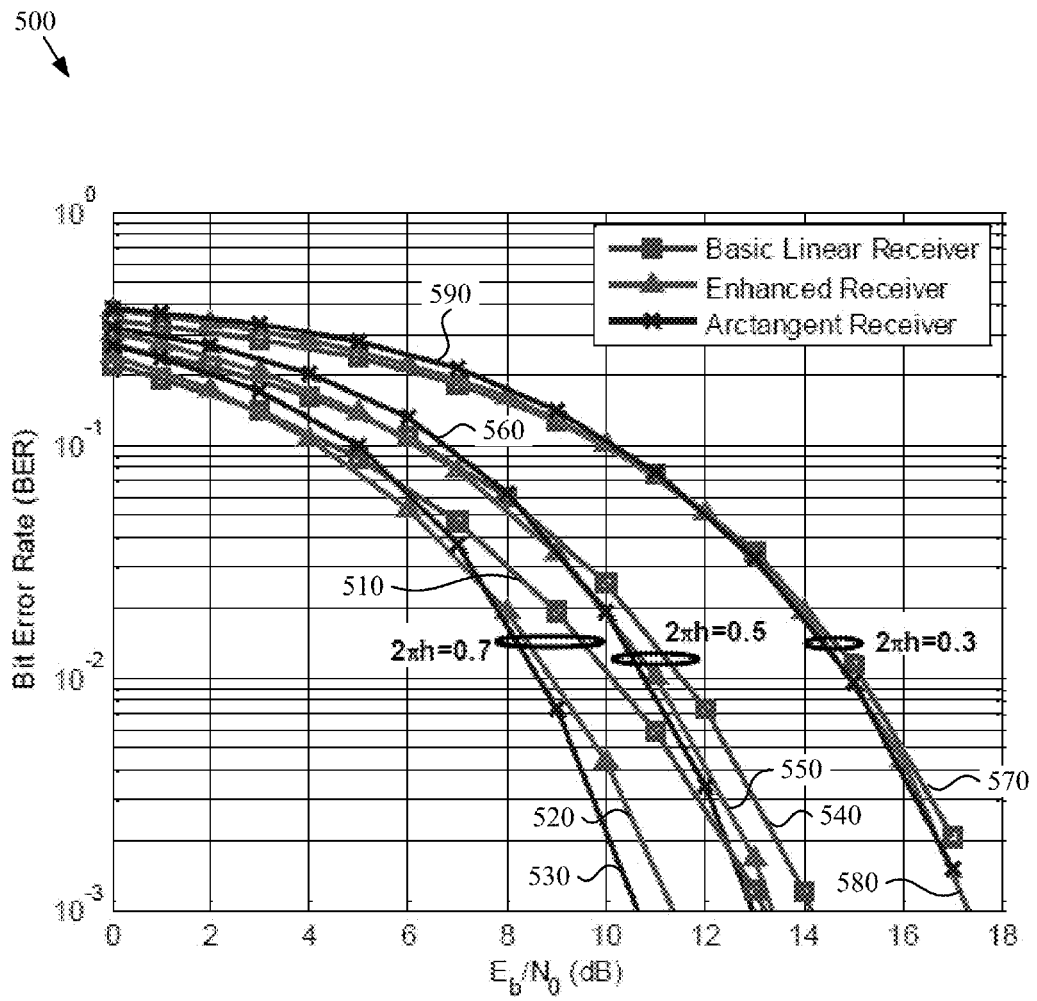
FIG. 7 shows a graph illustrating CE-OFDM simulation performance of the basic linear receiver and the enhanced receiver compared to the arctangent based receiver for N=64.

This improved receiver performs better than the basic linear receiver for moderate modulation indices due to the removal of the cubic distortion term. It is shown below that the cubic term degrades the performance as distortion only when it is present with a negative sign (as in (Eq. 7)) and that it in fact contributes constructively at the receiver when it is additive to the OFDM component (first term). Therefore, further improvement can be obtained by using an enhanced receiver (ER) with an additive cubic term given as $$R(t) = Q(t)(2 - I(t)) = \sin(x(t))(2 - \cos(x(t))) = \quad \text{(Eq. 8)}$$

$$\left(x(t) - \frac{x^3(t)}{3!} + \frac{x^5(t)}{5!} - \ldots\right)\left(1 + \frac{x^2(t)}{2!} - \frac{x^4(t)}{4!} + \ldots\right) =$$

$$x(t) + \frac{x^3(t)}{3} - \frac{7x^5(t)}{60} + \frac{31}{2520}x^7(t) - \frac{41}{60480}x^9(t) + \ldots$$

where $x(t) = 2\pi h m(t)$ is the CE-OFDM phase with the embedded OFDM signal. The performance of the basic linear receiver and the enhanced receiver for several modulation indices ($2\pi h$) is shown in graph 500 in FIG. 7, where it is compared with the conventional arctangent based receiver for the case of an Additive White Gaussian Noise (AWGN) channel.

Graph 500 shows the bit error rate (BER) versus $E_b/N_O$ for the basic linear receiver (BLR), the enhanced receiver (ER) shown in FIGS. 4-6, and the arctangent receiver (AR) shown in FIG. 3. Line 510 represents the BLR for $2\pi h = 0.7$, line 520 represents the ER for $2\pi h = 0.7$, line 530 represents the AR for $2\pi h = 0.7$, line 540 represents the BLR for $2\pi h = 0.5$, line 550 represents the ER for $2\pi h = 0.5$, line 560 represents the AR for $2\pi h = 0.5$, line 570 represents the BLR for $2\pi h = 0.3$, line 580 represents the ER for $2\pi h = 0.3$, and line 590 represents the AR for $2\pi h = 0.3$ While the basic linear receiver performs well for small modulation indices ($2\pi h \leq 0.5$), the enhanced receiver outperforms it, as expected, especially for moderate modulation indices ($0.5 \leq 2\pi h \leq 0.7$) when the contribution from the cubic term is significant. The receivers also perform well compared to the arctangent based receiver. For higher modulation indices, while the arctangent receiver performs better at low BERs, the ER outperforms it at higher BERs.

A further examination of the cubic term and its contribution at the receiver is warranted. For the case of sine and cosine subcarriers, with dsk and dck as the k-th data symbols present on the sine and cosine subcarriers respectively, the cubic term is given as $$x^3(t) = \left(2\pi h C_N \left(\sum_{k=1}^{\frac{N}{2}} dc_k \cos\left(\frac{2\pi k t}{T_s}\right) + ds_k \sin\left(\frac{2\pi k t}{T_s}\right)\right)\right)^3 \quad \text{(Eq. 9)}$$

By expanding out the terms and through repeated use of trigonometric identities, the cubic term can be represented as $$x^3(t) = \quad \text{(Eq. 10)}$$

$$(2\pi h C_N)^3 \sum_{l=1}^{\frac{N}{2}} \sum_{m=1}^{\frac{N}{2}} \sum_{n=1}^{\frac{N}{2}} \Big( \frac{1}{4}(dc_l dc_m dc_n + ds_l ds_m dc_n - dc_l ds_m ds_n +$$

$$ds_l dc_m ds_n) \cos\left(\frac{2\pi(-l+m+n)t}{T_s}\right) +$$

$$\frac{1}{4}(dc_l dc_m dc_n + ds_l ds_m dc_n + dc_l ds_m ds_n - ds_l dc_m ds_n)$$

$$\cos\left(\frac{2\pi(l-m+n)t}{T_s}\right) +$$

$$\frac{1}{4}(dc_l dc_m dc_n - ds_l ds_m dc_n + dc_l ds_m ds_n + ds_l dc_m ds_n)$$

$$\cos\left(\frac{2\pi(l+m-n)t}{T_s}\right) +$$

$$\frac{1}{4}(dc_l dc_m dc_n - ds_l ds_m dc_n - dc_l ds_m ds_n - ds_l dc_m ds_n)$$

$$\cos\left(\frac{2\pi(l+m+n)t}{T_s}\right) +$$

$$\frac{1}{4}(ds_l ds_m dc_n - ds_l dc_m dc_n + dc_l dc_m ds_n + ds_l ds_m ds_n)$$

$$\sin\left(\frac{2\pi(-l+m+n)t}{T_s}\right) +$$

$$\frac{1}{4}(-dc_l ds_m dc_n + ds_l dc_m dc_n + dc_l dc_m ds_n +$$

$$ds_l ds_m ds_n) \sin\left(\frac{2\pi(l-m+n)t}{T_s}\right) +$$

$$\frac{1}{4}(dc_l ds_m dc_n + ds_l dc_m dc_n - dc_l dc_m ds_n + ds_l ds_m ds_n)$$

$$\sin\left(\frac{2\pi(l+m-n)t}{T_s}\right) +$$

$$\frac{1}{4}(dc_l ds_m dc_n + ds_l dc_m dc_n + dc_l dc_m ds_n - ds_l ds_m ds_n)$$

$$\sin\left(\frac{2\pi(l+m+n)t}{T_s}\right)\Big)$$

This expression for the cubic term contains four sine terms and four cosine terms which result in sines and cosines at different locations for different combinations of l, m, and n over the triple summation (total terms=$8(N/2)3$). Only sines and cosines that fall on the OFDM sine and cosine subcarrier locations have an impact on the CE-OFDM performance. Consider the k-th cosine matched filter at the receiver corresponding to the $\cos(2\pi k t/T_s)$ subcarrier. The number of cosine/sine terms from the triple sum representing $x^3(t)$ in (Eq. 10) that impact the k-th cosine matched filter is given as $$N_{Total}^k = 3\left(\frac{N^2}{8} - \frac{N}{4} + \frac{kN}{2} - k^2 + k\right) + \left(\frac{k^2}{2} - \frac{3k}{2} + 1\right)u[k-3]. \quad \text{(Eq. 11)}$$

The number of these terms that contribute constructively is given as $$N_{correct} = 6\left(\frac{N}{2} - 1\right) + 3 = 3(N-1) \quad \text{(Eq. 12)}$$

The contribution due to the non-constructive terms at the subcarrier matched filter output can be shown to be well modeled as Gaussian distributed. Consider the coefficient of the first cosine term in (Eq. 10). It is given as $$dc_l dc_m dc_n + ds_l ds_m dc_n - dc_l ds_m ds_n + ds_l dc_m ds_n \quad \text{(Eq. 13)}$$

The data coefficients (dck,dsk {±1}) are zero mean, independent, identically distributed with a uniform probability density. Thus, each of the terms in (Eq. 13) is also distributed with a uniform probability density (±1). Furthermore, the terms in (Eq. 13) are uncorrelated Bernoulli random variables and thus pairwise independent for any combination of (l,m,n) that generates unique terms.

The application of the central limit theorem is known for the case of the sum of independent Bernoulli trials to model the resulting binomial distribution. Although the central limit theorem has been shown to hold for certain cases of pairwise independent identically distributed random variables, pairwise independence is not a sufficient condition in general for the central limit theorem. Therefore, Monte Carlo simulations were performed to show that the sum of the coefficients in (Eq. 10) is well modeled as Gaussian distributed.

Further examination also shows that each coefficient term from (Eq. 10) that affects the k-th cosine or sine matched filter is generated six times. For example, for k=4, the coefficient term is generated six times from the combinations of (l,m,n) of (1,2,3), (1,3,2), (2,1,3), (3,1,2), (2,3,1) and (3,2,1). Therefore, based on this observation and from (Eqs. 11 and 12), there are $N_{Distort}^k = 4*(N_{Total}^k - N_{correct})/6$ unique distortion causing coefficient terms with unit variance, each appearing six times, at the k-th cosine or sine matched filter. The sum of these coefficient terms is Gaussian distributed with variance, based on the sum of individual variances due to pairwise independence, given as $$\sigma_{k,cubic}^2 = \frac{6^2 * (2\pi hC_N)^6}{(3!)^2 * 4^2} N_{Distort}^k = \frac{(2\pi h)^6 N_{Distort}^k}{2N^3}. \quad \text{(Eq. 14)}$$

Figure 8:
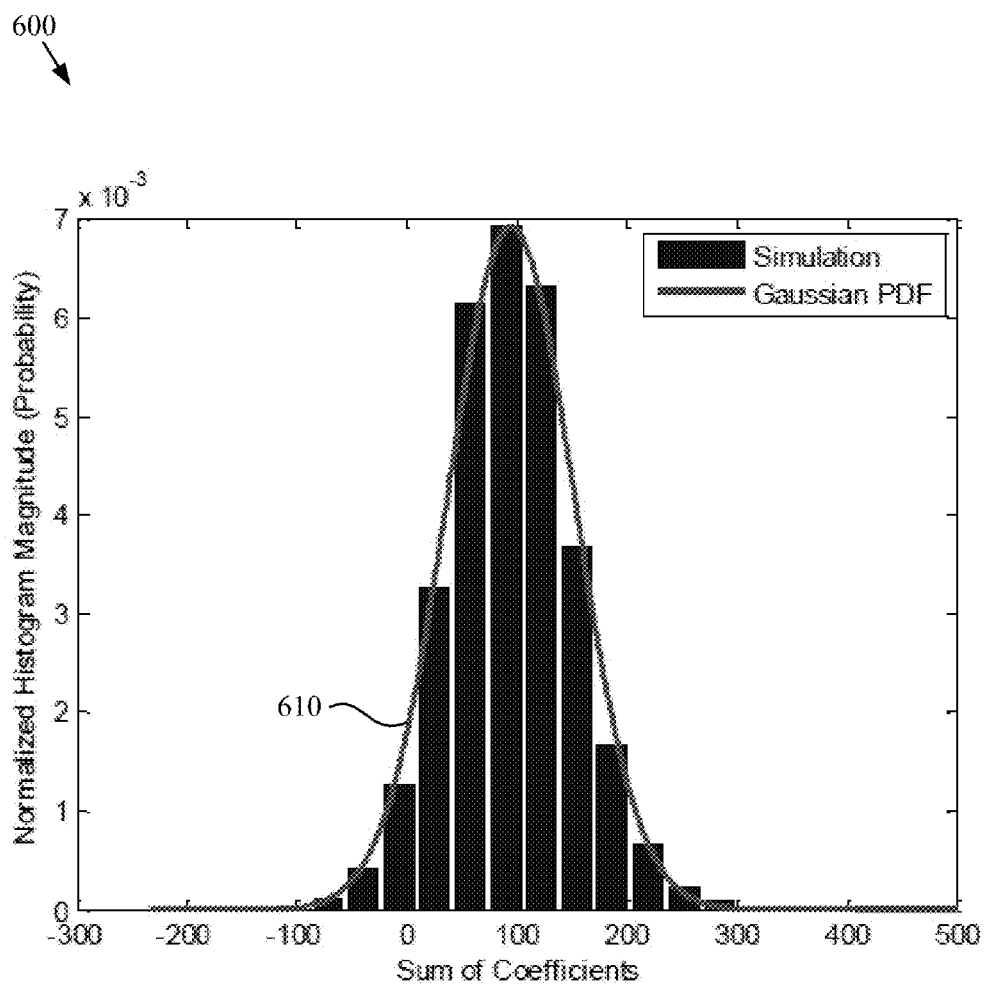
FIG. 8 shows a histogram illustrating the sum of the coefficients of all terms in an expression of cubic terms that impact the k-th matched filter for N=64 with dck=+1.

FIG. 8 shows the histogram 600 generated by simulating the coefficients of all terms from (Eq. 10) that impact the k-th cosine matched filter for N=64 with dck=+1. The sum of the coefficients that appear at the k-th cosine matched filter due to the cubic term (Eq. 10) matches well with the plotted Gaussian distribution represented by line 610 with a mean of 3*(N−1)/2 as predicted by (Eq. 12) and variance based on (Eq. 14). The bias in the mean towards dck due to the terms that contribute constructively is the reason that the presence of the additive cubic term helps improve the performance of the enhanced receiver compared to the basic linear receiver.

Performance approximations for the basic linear receiver and the enhanced receiver in AWGN can be obtained by considering the dominant first and third order signaling terms from the Taylor series expansion. The higher order signaling terms make a smaller contribution for modulation indices below 1 (2πh<1).

For the basic linear receiver, the output of the OFDM matched filter for the k-th cosine subcarrier based on the quadrature component of the received CE-OFDM signal is $$Y_k = \sum_{n=0}^{N_S-1} Q_r(nT_o)\cos\left(\frac{2\pi kn}{N_S}\right) \cong S_{k1} - S_{k2} + I_{k2} + N_k, \quad \text{(Eq. 15)}$$

where Sk1 is the signaling component due to the first term of (Eq. 7), which is simply the embedded OFDM signal. It is given as $$S_{k1} = \sum_{n=0}^{N_S-1} 2\pi hm(nT_o)\cos\left(\frac{2\pi kn}{N_S}\right) = dc_k 2\pi hC_N E_b N \quad \text{(Eq. 16)}$$

where $E_b N = E_s = N_s/2$. $S_{k2}$ is due to the component of the cubic term arising from terms with the correct data bits. The total number of terms with the correct data symbol is given in (Eq. 12). The signal component due to the negative cubic term based on (Eq. 7) and (Eq. 12) is given as $$S_{k2} = dc_k \frac{(2\pi hC_N)^3}{4}(N-1)E_b N. \quad \text{(Eq. 17)}$$

Nk is due to the baseband quadrature noise component, $$N_k = \sum_{n=0}^{N_S-1} n_s(nT_o)\cos\left(\frac{2\pi kn}{N_S}\right). \quad \text{(Eq. 18)}$$

It is Gaussian distributed with zero mean and variance $\sigma_n^2 = N_0 E_b N$. Ik2 is the distortion component due to the cubic term which was previously shown to be well modeled as Gaussian distributed. Therefore, Ik2 is Gaussian distributed with zero mean and variance $\sigma_I^2 = E_b N \sigma_{k,cubic}^2$, where $\sigma_{k,cubic}^2$ is given in (Eq. 14).

Without loss of generality, we can assume that dck=+1. The performance of the basic linear receiver for the k-th cosine subcarrier can then be given as $$P_b^k = Q\left(\sqrt{\frac{(S_{k1} - S_{k2})^2}{\sigma_n^2 + \sigma_I^2}}\right). \quad \text{(Eq. 19)}$$

Similarly, it can be shown that the performance of the k-th sine subcarrier is also given by (19). The overall performance over all subcarriers is then given as $$P_b = \frac{2}{N}\sum_{k=1}^{N/2} P_b^k.$$

Figure 9:
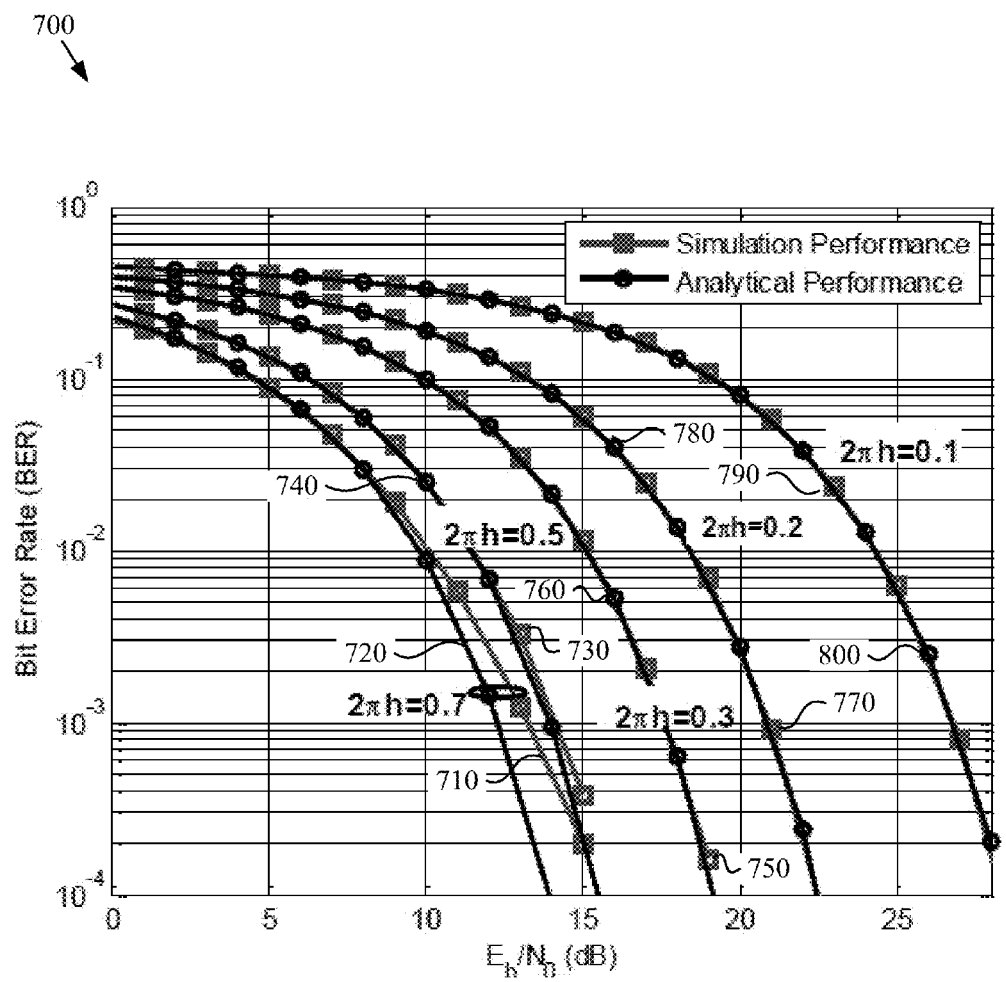
FIG. 9 shows a graph illustrating CE-OFDM simulation performance in comparison to the analytical approximation in AWGN for the basic linear receiver for N=64.

This performance approximation is plotted against the simulation performance in graph 700 shown in FIG. 9. As shown, line 710 represents simulated performance for 2πh=0.7, line 720 represents analytical performance for 2πh=0.7, line 730 represents simulated performance for 2πh=0.5, line 740 represents analytical performance for 2πh=0.5, line 750 represents simulated performance for 2πh=0.3, line 760 represents analytical performance for 2πh=0.3, line 770 represents simulated performance for 2πh=0.2, line 780 represents analytical performance for 2πh=0.2, line 790 represents simulated performance for 2πh=0.1, and line 800 represents analytical performance for 2πh=0.1.

For low modulation indices (2πh≤0.5), the performance approximation is very accurate. For the higher modulation index of 2πh=0.7, the higher order terms (fifth order and above) become more significant and therefore the approximation is not as accurate at low bit error rates (BERs). At low modulation indices when the cubic term is negligible and can be ignored, the performance approximation can be simplified as $$P_b = Q\left(\sqrt{\frac{S_{k1}^2}{\sigma_n^2}}\right) = Q\left(\sqrt{\frac{(2\pi h C_N E_b N)^2}{N_0 E_b N}}\right) = Q\left(2\pi h \sqrt{\frac{2E_b}{N_0}}\right). \quad \text{(Eq. 20)}$$

It should be noted that this performance approximation matches the performance approximation for the arctangent based receiver. Therefore, for low modulation indices, the AWGN performance of the arctangent and basic linear receivers are a close match, as was the case in FIG. 9.

The computation of the performance approximation for the enhanced receiver is more involved due to the large number of signal and noise terms. Therefore, for the enhanced receiver, we consider the case of low modulation indices ($2\pi h \leq 0.5$) when higher order terms are much smaller than the dominant signaling and noise terms and can thus be ignored. The received signal at the input of the OFDM demodulator in the enhanced receiver is $$R_r(t) = Q_r(t)(2-I_r(t)) = (\sin(x(t)) + n_s(t))(2-\cos(x(t))) - n_c(t) = R(t) + n_1(t) - n_2(t) - n_3(t) \quad \text{(Eq. 21)}$$

where R(t) was previously defined in (Eq. 8) and $$n_1(t) = n_s(t)(2-\cos(x(t)))$$

$$n_2(t) = n_c(t)\sin(x(t))$$

$$n_3(t) = n_c(t)n_s(t).$$

The output of the OFDM matched filter for the k-th cosine subcarrier is then given as $$Y_k = \quad \text{(Eq. 22)}$$

$$\sum_{n=0}^{N_S-1} R_r(nT_o)\cos\left(\frac{2\pi k n}{N_S}\right) \cong S_{k1} + 2S_{k2} + 2I_{k2} + N_{k1} + N_{k2} + N_{k3},$$

where Sk1 and Sk2 are from the first two terms of R(t) and were computed in (Eq. 16) and (Eq. 17) respectively. Nk1, Nk2, and Nk3 are zero mean noise terms due to n1(t), n2(t), and n3(t) respectively. Ik2 is the distortion component due to the cubic term modeled as Gaussian distributed with zero mean and variance $\sigma_I^2 = E_b N \sigma_{k,cubic}^2$. Let us consider Nk1 which is given as $$N_{k1} = \sum_{n=0}^{N_S-1} n_s(nT_o)(2-\cos(x(nT_o)))\cos\left(\frac{2\pi k n}{N_S}\right) = \quad \text{(Eq. 23)}$$

$$\sum_{n=0}^{N_S-1} n_s(nT_o)\left(1 + \frac{x^2(nT_o)}{2!} - \frac{x^4(nT_o)}{4!} + \ldots\right)\cos\left(\frac{2\pi k n}{N_S}\right).$$

Since the noise samples are uncorrelated, $E\{n_s(iT_o)n_s(jT_o)\} = N_0\delta[i-j]$, the variance of Nk1 can be computed as $$E\{N_{k1}^2\} = \quad \text{(Eq. 24)}$$

$$E\left\{\sum_{i=0}^{N_S-1}\sum_{j=0}^{N_S-1} n_s(iT_o)n_s(jT_o)\left(1 + \frac{x^2(iT_o)}{2!} - \frac{x^4(iT_o)}{4!} + \ldots\right)\left(1 + \frac{x^2(jT_o)}{2!} - \frac{x^4(jT_o)}{4!} + \ldots\right)\right.$$

$$\left.\cos\left(\frac{2\pi k i}{N_S}\right)\cos\left(\frac{2\pi k j}{N_S}\right)\right\} =$$

$$N_0\sum_{i=0}^{N_S-1} E\left\{\left(1 + \frac{x^2(iT_o)}{2!} - \frac{x^4(iT_o)}{4!} + \ldots\right)^2\right\}\cos^2\left(\frac{2\pi k i}{N_S}\right) =$$

$$N_0\sum_{i=0}^{N_S-1} E\left\{1 + x^2(iT_o) + \frac{x^4(iT_o)}{6} - \frac{7x^6(iT_o)}{180} + \ldots\right\}$$

$$\cos^2\left(\frac{2\pi k i}{N_S}\right).$$

The CE-OFDM phase, $x(t) = 2\pi h m(t)$, with the embedded OFDM signal can be modeled as Gaussian distributed based on the central limit theorem with variance $(2\pi h)^2$. The higher order moments for the case of a zero mean Gaussian random variable X are given as $$E\{X^v\} = \begin{cases} \sigma^v(v-1)!!, & v \text{ is even} \\ 0, & v \text{ is odd} \end{cases}, \quad \text{(Eq. 25)}$$

where the double factorial is defined as $z!! \equiv z*(z-2)* \ldots *3*1$ for odd z. The variance of Nk1 is then given as $$\sigma_{n1}^2 = E\{N_{k1}^2\} \cong N_0 E_b N\left(1 + (2\pi h)^2 + \frac{1}{2}(2\pi h)^4 - \frac{7}{12}(2\pi h)^6\right). \quad \text{(Eq. 26)}$$

The higher order terms are ignored. Similarly, Nk2 is given as $$N_{k2} = \sum_{n=0}^{N_S-1} n_c(nT_o)\sin(x(nT_o))\cos\left(\frac{2\pi k n}{N_S}\right) = \quad \text{(Eq. 27)}$$

$$\sum_{n=0}^{N_S-1} n_s(nT_o)\left(x(t) - \frac{x^3(t)}{3!} + \frac{x^5(t)}{5!} + \ldots\right)\cos\left(\frac{2\pi k n}{N_S}\right)$$

with variance $$\sigma_{n2}^2 \cong N_0 E_b N\left((2\pi h)^2 - (2\pi h)^4 + \frac{2}{3}(2\pi h)^6\right).$$

Finally, Nk3 is the cross noise term given as $$N_{k3} = \sum_{n=0}^{N_S-1} n_c(nT_o)n_s(nT_o)\cos\left(\frac{2\pi k n}{N_S}\right). \quad \text{(Eq. 28)}$$

Since the in phase and quadrature noise is uncorrelated, the variance of Nk3 can be shown to be $\sigma_{n3}^2 = N_0^2 E_b N$.

The overall noise at the output of the k-th cosine matched filter is then given as Nk,Total=Nk1+Nk2+Nk3. Since Nk1, Nk2, and Nk3 are uncorrelated, the variance of Nk,Total is simply the sum of the individual variances, $\sigma_{n,Total}^2 = \sigma_{n1}^2 +$ $\sigma_{n2}^2 + \sigma_{n3}^2$. Furthermore, Nk,Total is the sum of non-identically distributed independent random variables and it satisfies the Lindberg condition which is a sufficient condition for the central limit theorem to hold. Therefore, the overall noise, Nk, Total, can be modeled as Gaussian distributed with variance $\sigma_{n,Total}^2$. The performance approximation for the enhanced receiver for small modulation indices (2πh≤0.5) for the k-th cosine subcarrier is then given as $$P_b^k = Q\left(\sqrt{\frac{(S_{k1} + 2S_{k2})^2}{\sigma_{n,Total}^2 + 4\sigma_I^2}}\right). \tag{Eq. 29}$$

Figure 10:
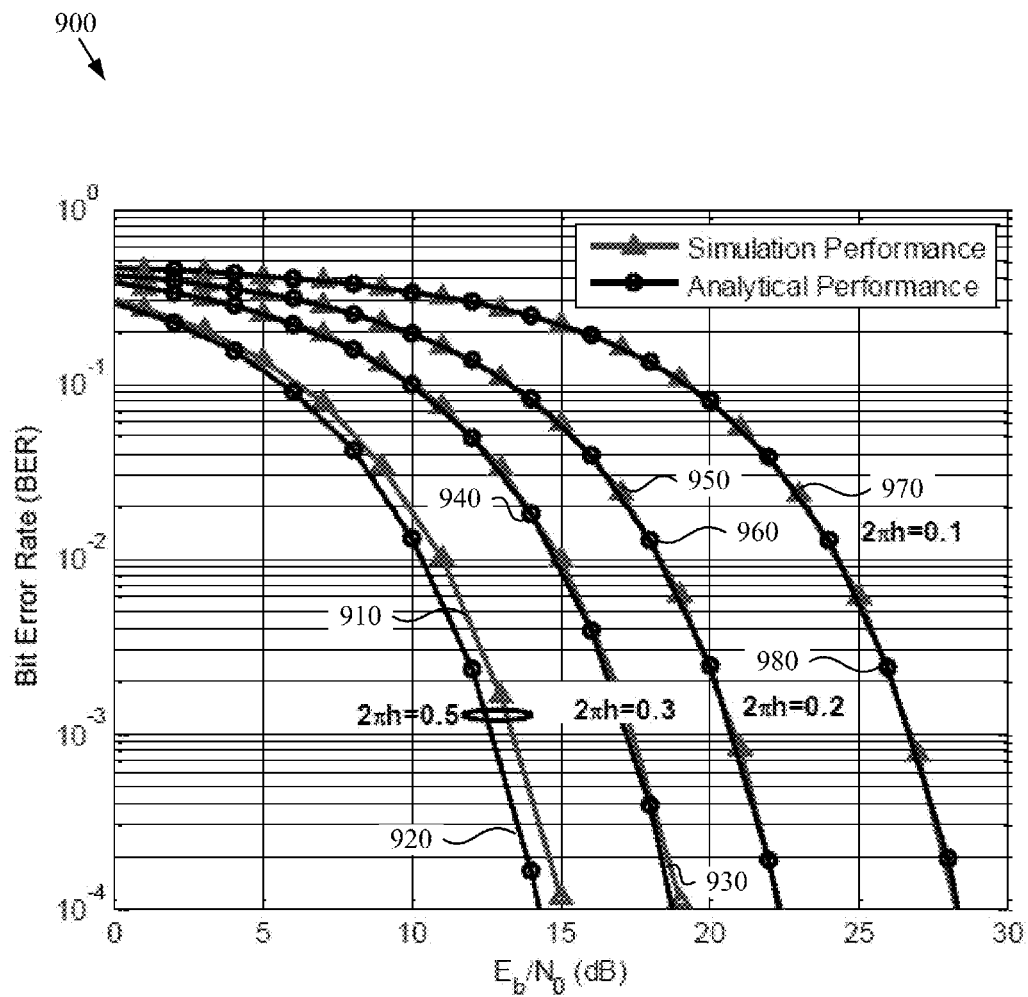
FIG. 10 shows a graph illustrating CE-OFDM simulation performance in comparison to the analytical approximation in AWGN for the enhanced receiver for N=64.

Similarly, it can be shown that the performance of the k-th sine subcarrier is also given by (Eq. 29). The performance over all subcarriers is given as $$P_b = \frac{2}{N}\sum_{k=1}^{N/2} P_b^k$$

and is plotted in graph 900 shown in FIG. 10, which shows good agreement with simulation performance.

As shown by graph 900, line 910 represents simulated performance for 2πh=0.5, line 920 represents analytical performance for 2πh=0.5, line 930 represents simulated performance for 2πh=0.3, line 940 represents analytical performance for 2πh=0.3, line 950 represents simulated performance for 2πh=0.2, line 960 represents analytical performance for 2πh=0.2, line 970 represents simulated performance for 2πh=0.1, and line 980 represents analytical performance for 2πh=0.1.

The performance of the new CE-OFDM receivers in frequency selective multipath fading channels is studied as well. A frequency domain equalizer (FDE) provides good equalization performance for CE-OFDM in time-invariant frequency selective fading channels when the arctangent receiver is employed. Here, it is shown that the FDE also works well for the case of the basic linear receiver and the enhanced receiver. When a cyclic prefix is used, the linear convolution with the channel is transformed to a circular convolution.

Taking advantage of this property, the FDE can be implemented by performing the discrete Fourier transform (DFT) on the received signal followed by single tap equalization per subcarrier to correct the effect of the channel, Hk, at each subcarrier. Finally, the inverse DFT is employed to obtain the equalized signal. Here, a minimum mean squared error (MMSE) criterion is employed to obtain the equalizer taps as $$C_k = \frac{H_k^*}{|H_k|^2 + \gamma^{-1}}, \tag{Eq. 30}$$

where γ=Eb/N0. Simulations were performed for two channel models representing frequency selective fading channels.

The channel models were defined based on the statistics of the channel impulse response, h[l] of length L, which was normalized as $\Sigma_{l=0}^{L-1} E\{|h[l]|^2\}=1$. Channel A is a two path model with equal power from both paths with the second path delayed by 5 µs. It has a coherence bandwidth around 67 kHz. Channel B has an exponential power delay profile (PDP) with a delay spread of 9 µs and $E\{|h[l]|^2\} \propto e^{-\tau/2\mu s}$, 0≤τl≤9 µs. It has a coherence bandwidth around 147 kHz. The performance of the BLR and ER as well as the AR for channels A and B is presented in graph 1100 in FIG. 11 and in graph 1200 in FIG. 12. Evaluation was performed with a CE-OFDM symbol period of Ts=128 µs, a cyclic prefix of 10 µs, and FDE based equalization with perfect channel state information (CSI). An oversampling factor of 2 (T0=1 µs) results in a system front-end bandwidth of 1 MHz.

Figure 11:
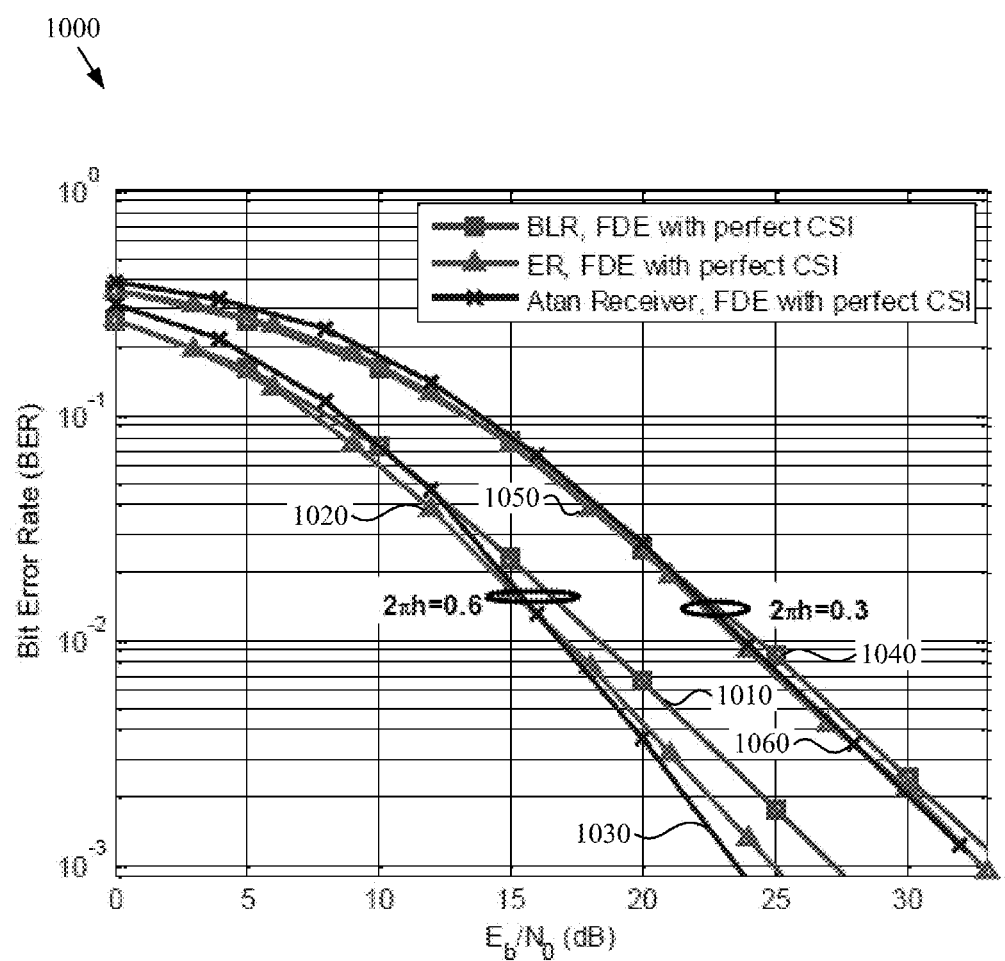
FIG. 11 shows a graph illustrating CE-OFDM receiver performance comparison in frequency selective fading for two paths with equal power using a FDE for N=64.

As shown in FIG. 11, line 1010 represents BLR, FDE with perfect CSI for 2πh=0.6, line 1020 represents ER, FDE with perfect CSI for 2πh=0.6, line 1030 represents AR, FDE with perfect CSI for 2πh=0.6, line 1040 represents BLR, FDE with perfect CSI for 2πh=0.3, line 1050 represents ER, FDE with perfect CSI for 2πh=0.3, and line 1060 represents AR, FDE with perfect CSI for 2πh=0.3.

Figure 12:
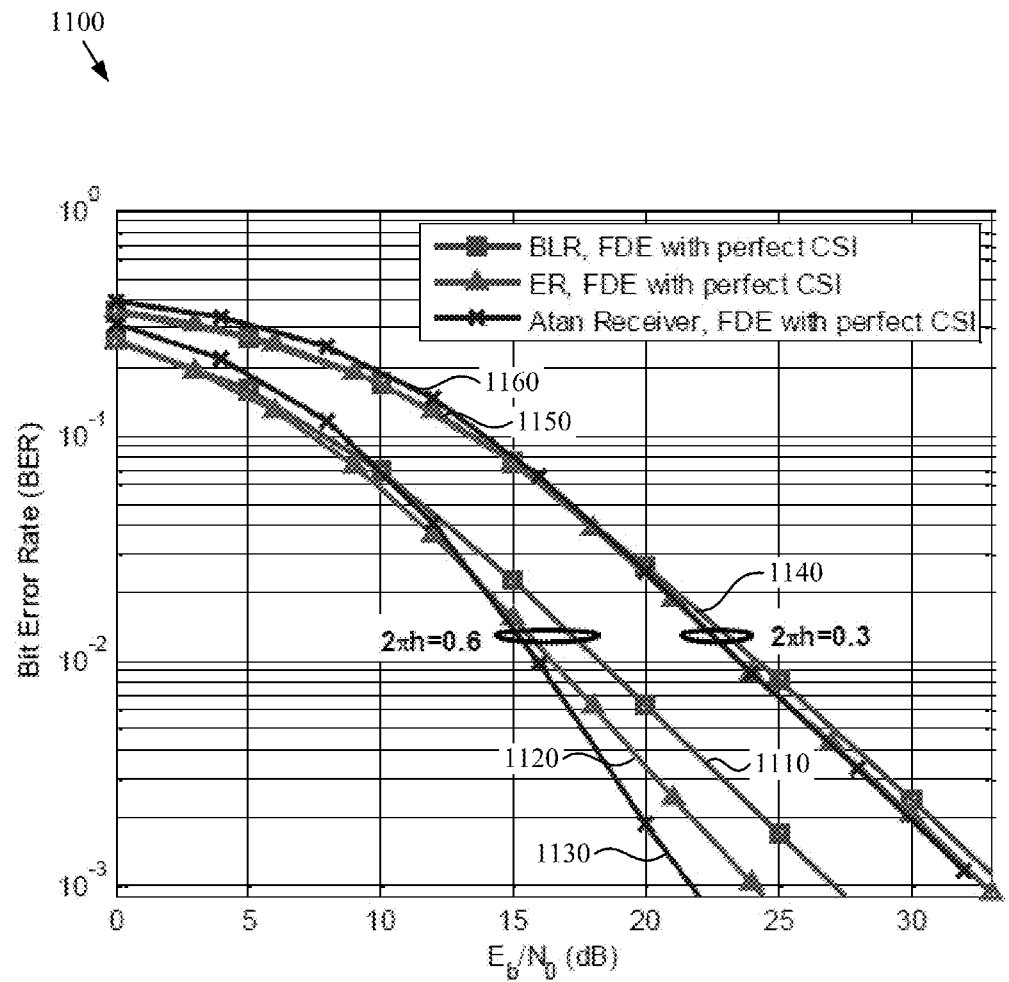
FIG. 12 shows a graph illustrating CE-OFDM receiver performance comparison in frequency selective fading for an exponential power delay profile using a FDE for N=64.

As shown in FIG. 12, line 1110 represents BLR, FDE with perfect CSI for 2πh=0.6, line 1120 represents ER, FDE with perfect CSI for 2πh=0.6, line 1130 represents AR, FDE with perfect CSI for 2πh=0.6, line 1140 represents BLR, FDE with perfect CSI for 2πh=0.3, line 1150 represents ER, FDE with perfect CSI for 2πh=0.3, and line 1160 represents AR, FDE with perfect CSI for 2πh=0.3.

Both the receivers, BLR and ER, perform well compared to the arctangent receiver for all cases. While the arctangent receiver provides better performance at low BERs for 2πh=0.6, the ER outperforms it at high BERs. For example, the ER provides over 1.2 dB better performance at a BER of 0.1 for channel B. This has a significant impact on the error correction coding performance as shown below.

As previously discussed, the noise at the matched filter outputs of the BLR is Gaussian distributed. Also, for the ER and the arctangent receiver, the noise is well modeled as Gaussian distributed. Therefore, the conditional probability density function (PDF) of the k-th matched filter output Yk given input data dk is given as $$p(Y_k \mid d_k) = \frac{1}{\sqrt{2\pi\sigma_n^2}} e^{-\frac{(Y_k - S_k)^2}{2\sigma_n^2}}, \tag{Eq. 31}$$

where Sk is the signaling component of the matched filter output and $\sigma_n^2$ is the noise variance. When the matched filter outputs are exactly Gaussian distributed, the maximum likelihood (ML) sequence d of length $L_d$ which maximizes the joint conditional PDF of the Yk's leads to the ML detector that minimizes the Euclidean distance metric. By modeling the matched filter outputs as Gaussian distributed, the decoding metrics for the arctangent, basic linear and enhanced receivers are obtained as below. It should be noted that the decoding metric can only be considered the maximum likelihood decoding metric for the case of the BLR for which the noise is exactly Gaussian distributed.

Arctangent receiver: $D = \Sigma_{l=1}^{L_d}(Y_l - d_l 2\pi h C_N N E_b)^2$. (Eq. 32)

$$BLR: D = \sum_{l=1}^{L_d}\left(Y_l - d_l 2\pi h C_N E_b N\left(1 - \frac{(2\pi h C_N)^2}{4}(N-1)\right)\right)^2. \tag{Eq. 33}$$

$$ER: D = \sum_{l=1}^{L_d}\left(Y_l - d_l 2\pi h C_N E_b N\left(1 + \frac{(2\pi h C_N)^2}{2}(N-1)\right)\right)^2. \quad \text{(Eq. 34)}$$

While the arctangent based receiver generally provides slightly better performance than the ER at low BERs for moderate modulation indices, the ER provides better performance at high BERs (BER>0.05 in most cases). Since the error control coding corrects all errors that fall within the code's minimum distance, the performance advantage of the ER at high BERs (>10-2) translates into a significant performance advantage in a coded system.

Figure 13:
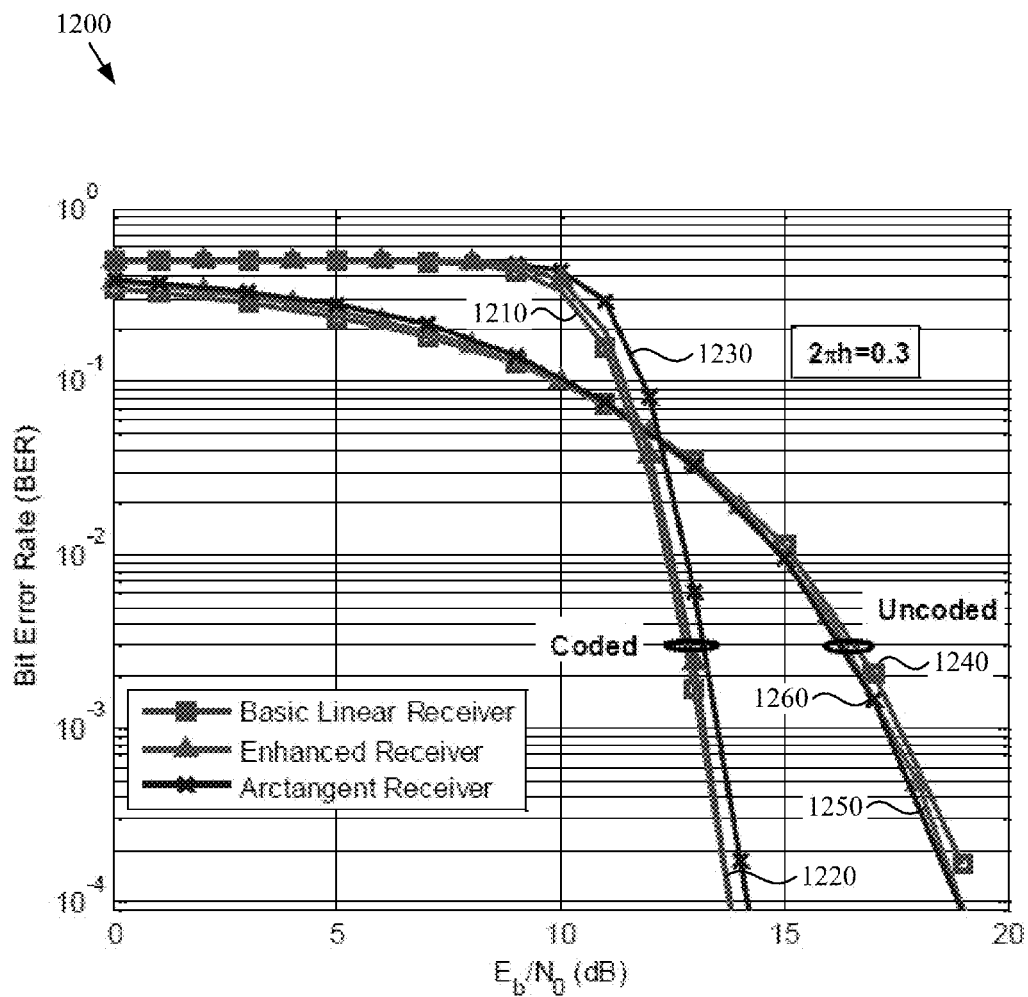
FIG. 13 shows a graph illustrating CE-OFDM performance of the BLR, ER and Arctangent receivers in AWGN using a rate ½ convolutional code of constraint length 9 for N=64, where $2\pi h=0.3$.
Figure 14:
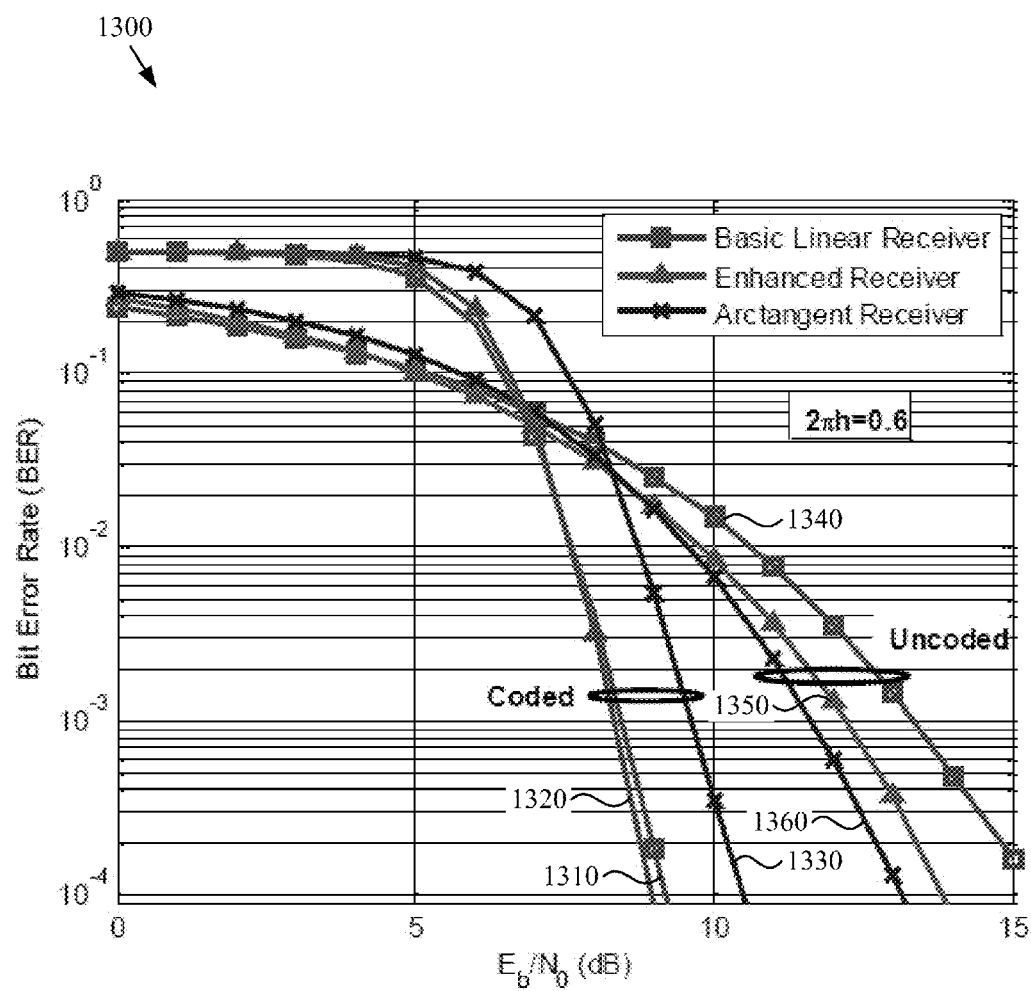
FIG. 14 shows a graph illustrating CE-OFDM performance of the BLR, ER and Arctangent receivers in AWGN using a rate ½ convolutional code of constraint length 9 for N=64, where $2\pi h=0.6$.

FIGS. 13 and 14 show the performance comparison of CE-OFDM in AWGN for the case of a rate ½ convolutional code with a constraint length of 9 with Viterbi decoding. Both the BLR and ER provide slightly better performance than the arctangent receiver for 2πh=0.3. For the case of 2πh=0.6, the performance advantage is much more significant, over 1.2 dB at a BER of 10-3.

As shown in graph 1200 in FIG. 13, 2πh=0.3 and line 1210 represents the BLR with a coded signal, line 1220 represents the ER with a coded signal, line 1230 represents the AR with a coded signal, line 1240 represents the BLR with an uncoded signal, line 1250 represents the ER with an uncoded signal, and line 1260 represents the AR with an uncoded signal. As shown in graph 1300 in FIG. 14, 2πh=0.6 and line 1310 represents the BLR with a coded signal, line 1320 represents the ER with a coded signal, line 1330 represents the AR with a coded signal, line 1340 represents the BLR with an uncoded signal, line 1350 represents the ER with an uncoded signal, and line 1360 represents the AR with an uncoded signal.

Figure 15:
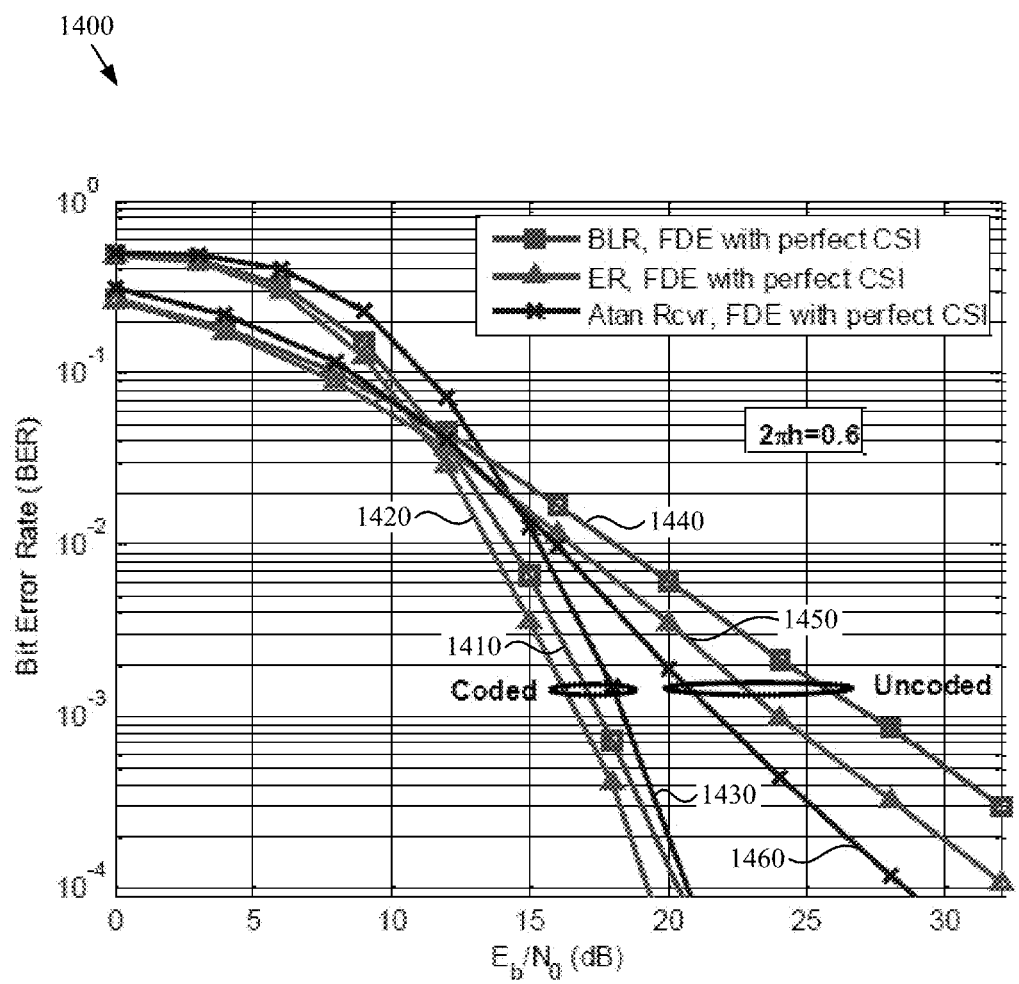
FIG. 15 shows a graph illustrating CE-OFDM performance of the BLR, ER and Arctangent receivers in frequency selective fading for an exponential power delay profile using a rate 1/2 convolutional code of constraint length 9 for N=64, where $2\pi h=0.6$.

FIG. 15 shows a graph 1400 illustrating a performance comparison for a frequency selective fading channel (Channel B) when an FDE is employed along with error correction coding. Both the BLR and ER receivers outperform the arctangent receiver in this case as well, with the ER providing better performance by over 1.6 dB at a BER of 10-3. As shown in graph 1400, 2πh=0.6 and line 1410 represents BLR, FDE with perfect CSI for a coded signal, line 1420 represents ER, FDE, with perfect CSI for a coded signal, line 1430 represents AR, FCE with perfect CSI for a coded signal, line 1440 represents BLR, FDE with perfect CSI for an uncoded signal, line 1450 represents ER, FDE, with perfect CSI for an uncoded signal, and line 1460 represents AR, FCE with perfect CSI for an uncoded signal.

Figure 16:
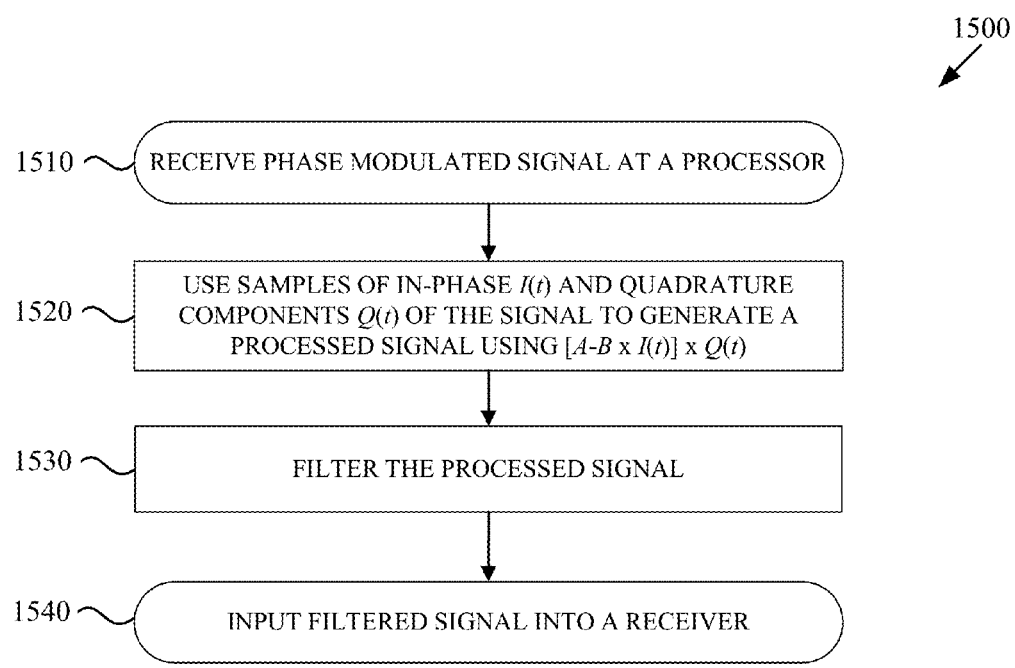
FIG. 16 shows a flowchart of an embodiment of a method in accordance with the Receiver Architecture for Constant Envelope OFDM.

FIG. 16 shows a flowchart of an embodiment of a method 1500 in accordance with the Receiver Architecture for Constant Envelope OFDM. As an example, method 1500 may be performed by system 400 as shown in FIG. 6, and will be discussed with reference thereto. Further, while FIG. 16 shows one embodiment of method 1500 to include steps 1510-1540, other embodiments of method 1500 may contain fewer or more steps. Further, while in some embodiments the steps of method 1500 may be performed as shown in FIG. 16, in other embodiments the steps may be performed in a different order, or certain steps may occur simultaneously with one or more other steps.

Method 1500 may begin with step 1510, which involves receiving a phase modulated signal 402 at a processor 420. Step 1520 involves using one or more samples of an in-phase component I(t) and a quadrature component Q(t) of the received phase modulated signal to generate, at processor 420, a processed signal using the equation [A−B×I(t)]×Q(t), as is implemented using components 422, 424, 426, 428, 430, 432, and/or 434, wherein A and B are numerical parameters. Step 1530 involves filtering the processed received signal using filter 440 prior to inputting the processed signal into receiver 450. Step 1540 involves inputting the processed signal into receiver 450 operatively connected to processor 420. In some embodiments, method 1500 proceeds directly from step 1520 to step 1540, bypassing the filtering performed by step 1530. As noted above, filtering prior to the receiver may not be necessary in some embodiments, such as, for example, when the receiver contains filtering means therein.

Method 1500 may be implemented as a series of modules, either functioning alone or in concert, with physical electronic and computer hardware devices. Method 1500 may be computer-implemented as a program product comprising a plurality of such modules, which may be displayed for a user. Method 1500 may be implemented on a digital signal processor (DSP) or a field programmable gate array (FPGA) or a stand-alone microelectronic chip or a software defined radio (SDR) or a combination of them.

Various storage media, such as magnetic computer disks, optical disks, and electronic memories, as well as non-transitory computer-readable storage media and computer program products, can be prepared that can contain information that can direct a device, such as a micro-controller, to implement the above-described systems and/or methods. Once an appropriate device has access to the information and programs contained on the storage media, the storage media can provide the information and programs to the device, enabling the device to perform the above-described systems and/or methods.

For example, if a computer disk containing appropriate materials, such as a source file, an object file, or an executable file, were provided to a computer, the computer could receive the information, appropriately configure itself and perform the functions of the various systems and methods outlined in the diagrams and flowcharts above to implement the various functions. That is, the computer could receive various portions of information from the disk relating to different elements of the above-described systems and/or methods, implement the individual systems and/or methods, and coordinate the functions of the individual systems and/or methods.

Many modifications and variations of the Receiver Architecture for Constant Envelope OFDM are possible in light of the above description. Within the scope of the appended claims, the embodiments of the systems described herein may be practiced otherwise than as specifically described. The scope of the claims is not limited to the implementations and the embodiments disclosed herein, but extends to other implementations and embodiments as may be contemplated by those having ordinary skill in the art.

I claim:
1. A method comprising:
  receiving a phase modulated constant envelope (CE) orthogonal frequency-division multiplexing (OFDM) signal at a processor, wherein the processor has components including a first mixer, a second mixer, and a summer therein:
  using one or more samples of an in-phase component I(t) and a quadrature component Q(t) of the received phase modulated CE OFDM signal to generate, at the processor, a processed signal using an equation [A−B×I(t)]×Q(t), wherein A and B are numerical parameters, wherein the first mixer combines I(t) with B, wherein the summer sums output of the first mixer with A, wherein the second mixer combines output of the summer with Q(t), wherein output of the second mixer is the processed signal; and inputting the processed signal into an OFDM receiver operatively connected to the processor.

2. The method of claim 1 further comprising filtering the processed signal prior to inputting the processed signal into the OFDM receiver.

3. The method of claim 1, wherein A and B are selected to vary complexity and performance of the OFDM receiver while controlling distortion for different modulation indices.

4. The method of claim 1, wherein A=1 and B=0.

5. The method of claim 1, wherein A=2 and B=1.

6. The method of claim 1, wherein A=4 and B=1.

7. A system comprising:
a processor operatively connected to an orthogonal frequency-division multiplexing (OFDM) receiver, the processor having components including a first mixer, a second mixer, and a summer therein, the processor configured to receive a phase modulated constant envelope OFDM signal and use one or more samples of an in-phase component I(t) and a quadrature component Q(t) of the phase modulated constant envelope OFDM signal to generate a processed signal using an equation $[A-B \times I(t)] \times Q(t)$, wherein A and B are numerical parameters, wherein the first mixer combines I(t) with B, wherein the summer sums output of the first mixer with A, wherein the second mixer combines output of the summer with Q(t), wherein output of the second mixer is the processed signal wherein the processor is further configured to input the processed signal into the OFDM receiver.

8. The system of claim 7 further comprising a filter, operatively connected between the processor and the OFDM receiver, configured to filter the processed signal prior to input of the processed signal into the OFDM receiver.

* * * * *